US010527757B2

(12) United States Patent
Chang et al.

(10) Patent No.: US 10,527,757 B2
(45) Date of Patent: Jan. 7, 2020

(54) AMPHIPHILIC BRANCHED POLYDIORGANOSILOXANE MACROMERS

(71) Applicant: Novartis AG, Basel (CH)

(72) Inventors: Frank Chang, Cumming, GA (US); Feng Jing, Snellville, GA (US); Fei Cheng, Suwanee, GA (US); Ying Zheng, Suwanee, GA (US)

(73) Assignee: Novartis AG, Basel (CH)

( * ) Notice: Subject to any disclaimer, the term of this patent is extended or adjusted under 35 U.S.C. 154(b) by 103 days.

(21) Appl. No.: 15/792,807

(22) Filed: Oct. 25, 2017

(65) Prior Publication Data
US 2018/0113237 A1 Apr. 26, 2018

Related U.S. Application Data

(60) Provisional application No. 62/412,921, filed on Oct. 26, 2016.

(51) Int. Cl.
G02B 1/04 (2006.01)
C08G 77/20 (2006.01)
C08G 77/28 (2006.01)
C08J 3/075 (2006.01)
C08L 25/06 (2006.01)
C08L 33/10 (2006.01)
C08L 83/08 (2006.01)
B29D 11/00 (2006.01)
C08F 283/12 (2006.01)
C08F 290/06 (2006.01)
C08F 299/08 (2006.01)
C08J 3/24 (2006.01)

(52) U.S. Cl.
CPC ........ G02B 1/043 (2013.01); B29D 11/00038 (2013.01); B29D 11/00134 (2013.01); C08F 283/12 (2013.01); C08F 290/068 (2013.01); C08F 299/08 (2013.01); C08G 77/20 (2013.01); C08G 77/28 (2013.01); C08J 3/075 (2013.01); C08L 25/06 (2013.01); C08L 33/10 (2013.01); C08L 83/08 (2013.01); C08G 2210/00 (2013.01); C08J 3/247 (2013.01); C08J 2383/08 (2013.01); C08L 2205/02 (2013.01)

(58) Field of Classification Search
CPC ..................................................... G02B 1/043
See application file for complete search history.

(56) References Cited

U.S. PATENT DOCUMENTS

| | | |
|---|---|---|
| 4,444,711 A | 4/1984 | Schad |
| 4,460,534 A | 7/1984 | Boehm |
| 5,508,317 A | 4/1996 | Muller |
| 5,527,925 A * | 6/1996 | Chabrecek ............ C07C 271/20 522/35 |
| 5,789,464 A | 8/1998 | Muller |
| 5,843,346 A | 12/1998 | Morrill |
| 5,849,810 A | 12/1998 | Muller |
| 5,894,002 A | 4/1999 | Boneberger |
| 6,039,913 A | 3/2000 | Hirt |
| 6,043,328 A | 3/2000 | Domschke |
| 6,367,929 B1 | 4/2002 | Maiden |
| 6,627,124 B1 | 9/2003 | Herbrechtsmeier |
| 6,719,929 B2 | 4/2004 | Winterton |
| 6,800,225 B1 | 10/2004 | Hagmann |
| 6,822,016 B2 | 11/2004 | McCabe |
| 7,091,283 B2 | 8/2006 | Muller |
| 7,238,750 B2 | 7/2007 | Muller |
| 7,268,189 B2 | 9/2007 | Muller |
| 7,384,590 B2 | 6/2008 | Kelly |
| 7,387,759 B2 | 6/2008 | Kelly |
| 7,521,519 B1 | 4/2009 | Hirt |
| 7,605,190 B2 | 10/2009 | Moszner |
| 7,858,000 B2 | 12/2010 | Winterton |
| 7,915,323 B2 | 3/2011 | Awasthi |
| 8,003,710 B2 | 8/2011 | Medina |
| 8,017,703 B2 | 9/2011 | Schwind |
| 8,044,111 B2 | 10/2011 | Chang |
| 8,048,968 B2 | 11/2011 | Phelan |
| 8,071,658 B2 | 12/2011 | Zhou |
| 8,071,703 B2 | 12/2011 | Zhou et al. |
| 8,147,897 B2 | 4/2012 | Ferreiro |
| 8,163,206 B2 | 4/2012 | Chang |
| 8,404,759 B2 | 3/2013 | Phelan |
| 8,404,783 B2 | 3/2013 | Chang |
| 8,409,599 B2 | 4/2013 | Wu |
| 8,420,711 B2 | 4/2013 | Awasthi |
| 8,524,800 B2 | 9/2013 | Phelan |
| 9,097,840 B2 | 8/2015 | Chang |
| 9,103,965 B2 | 8/2015 | Chang |

(Continued)

FOREIGN PATENT DOCUMENTS

| | | |
|---|---|---|
| EP | 0632329 A1 | 1/1995 |
| EP | 2927253 A1 | 10/2015 |
| WO | 2016/048853 A1 | 3/2016 |

OTHER PUBLICATIONS

Espeel, P., et. al; One-Pot Multi-Step Reactions Based on Thiolactone Chemistry: A Powerful Synthetic Tool in Polymer Science; European Polymer Journal 62 (2015) 247-272.

(Continued)

Primary Examiner — Michael F Pepitone
(74) Attorney, Agent, or Firm — Jian Zhou

(57) ABSTRACT

The invention provides a class of amphiphilic branched polydiorganosiloxane macromers and the uses thereof. Such a macromer comprises a polydiorganosiloxane polymer chain and two terminal groups free of any ethylenically unsaturated group, wherein the polydiorganosiloxane polymer chain comprises (1) at least 5 dimethylsiloxane units in a consecutive sequence, (2) at least two first siloxane units each having methyl as one of the two substituents of each first siloxane unit and one first organic radical having one sole (meth)acryloyl group as the other substituent, (3) at least one second siloxane unit having methyl as one of the two substituents of the second siloxane unit and one second organic radical, which is free of any ethylenically unsaturated group and comprises one or more hydrophilic groups or polymer chains, as the other substituent.

20 Claims, No Drawings

(56) References Cited

U.S. PATENT DOCUMENTS

| | | |
|---|---|---|
| 9,475,827 B2 | 10/2016 | Chang |
| 2007/0291223 A1 | 12/2007 | Chen et al. |
| 2011/0134387 A1 | 6/2011 | Samuel |
| 2012/0026457 A1 | 2/2012 | Qiu |
| 2012/0244088 A1 | 9/2012 | Saxena |
| 2012/0245249 A1 | 9/2012 | Saxena |
| 2013/0118127 A1 | 5/2013 | Kolluru |
| 2014/0005430 A1* | 1/2014 | Chang .................. C08G 77/388 556/420 |
| 2015/0309210 A1 | 10/2015 | Huang |
| 2015/0309211 A1 | 10/2015 | Huang |
| 2015/0309213 A1* | 10/2015 | Chang ..................... C07F 7/089 523/107 |
| 2017/0166673 A1 | 6/2017 | Huang |

OTHER PUBLICATIONS

Espeel, P., et. al; One-Pot Double Modification of Polymers Based on Thiolactone Chemistry; Adv. Polym Sci (2015) 269: 105-132.

\* cited by examiner

AMPHIPHILIC BRANCHED POLYDIORGANOSILOXANE MACROMERS

This application claims the benefit under 35 USC § 119(e) of U.S. provisional application No. 62/412,921 filed 26 Oct. 2016, incorporated by reference in its entirety.

The present invention is related to a class of amphiphilic branched polydiorganosiloxane macromers and uses thereof. In particular, the present invention is related to silicone hydrogel contact lenses made from a lens formulation including an amphiphilic branched polydiorganosiloxane macromer.

BACKGROUND

Most commercially available silicone hydrogel contact lenses are produced according to a conventional cast molding technique involving use of disposable plastic molds and a mixture of monomers in the presence or absence of macromers. However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Such disadvantages encountered in a conventional cast-molding technique can be overcome by using the so-called Lightstream Technology™ (Alcon), as illustrated in U.S. Pat. Nos. 5,508,317, 5,789,464, 5,849,810, and 6,800,225, which are incorporated by reference in their entireties. The Lightstream Technology™ involves reusable molds produced in high precision and curing under a spatial limitation of actinic radiation (e.g., UV). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield.

U.S. Pat. No. 8,163,206 (herein incorporated by reference in its entirety) discloses a method for making silicone hydrogel contact lenses from a monomer mixture (i.e., a lens-forming composition) according to the Lightstream Technology™. However, it is discovered here that in addition to relatively longer curing time, relatively significant shrinkage during curing of the monomer mixture in molds can occur that may greatly impede the application of the Lightstream Technology™ in the manufacturing of silicone hydrogel contact lenses.

U.S. Pat. Nos. 6,039,913, 6,043,328, 7,091,283, 7,268,189, 7,238,750, 7,521,519, 8,003,710, 8,044,111, 8,048,968, 8,071,658, 8,071,703, 8,404,759, 8,404,783, 8,524,800 (which are incorporated by reference in their entireties) discloses silicone-containing macromers (or prepolymers) for making silicone hydrogel contact lenses according to Lightstream Technology™. However, those types of prepolymers disclosed in the above patents and patent applications may have some practical limitations in their use for making silicone hydrogel contact lenses according to Lightstream Technology™.

Therefore, there is still a need for new amphiphilic macromers suitable for making silicone hydrogel contact lenses according to the Lightstream Technology™.

SUMMARY OF THE INVENTION

The present invention, in one aspect, provides an amphiphilic branched polydiorganosiloxane macromer. The amphiphilic branched polydiorganosiloxane macromer of the invention comprises: a linear polydiorganosiloxane polymer chain and two terminal groups free of any ethylenically unsaturated group, wherein the linear polydiorganosiloxane polymer chain comprises (1) at least 5 dimethylsiloxane units in a consecutive sequence, (2) at least two siloxane units of

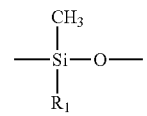

in which $R_1$ is a first organic radical having one sole (meth)acryloyl group, (3) at least one siloxane unit

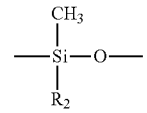

in which $R_2$ is a second organic radical which is free of any ethylenically unsaturated group and comprises at least two amide moiety and one or more hydrophilic groups or polymer chains.

In another aspect, the invention provides a silicone hydrogel contact lens comprising a crosslinked polymeric material comprising: units of an amphiphilic branched polydiorganosiloxane macromer of the invention as described above, wherein the silicone hydrogel contact lens, when being fully hydrated, has an oxygen permeability (Dk) of at least about 70 barrers, a water content of from about 25% to about 70% by weight, an elastic modulus of from about 0.20 MPa to about 1.2 MPa.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises at least one amphiphilic branched polydiorganosiloxane macromer of the invention as described above and at least one free-radical initiator; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein in this application means that a number, which is referred to as "about", comprises the recited number plus or minus 1-10% of that recited number.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a crosslinked polymeric material which is insoluble in water, but can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or at least one silicone-containing vinylic macromer or at least one actinically-crosslinkable silicone-containing prepolymer.

"Hydrophilic," as used herein, describes a material or portion thereof that will more readily associate with water than with lipids.

A "vinylic monomer" refers to a compound that has one sole ethylenically unsaturated group and is soluble in a solvent.

The term "soluble", in reference to a compound or material in a solvent, means that the compound or material can be dissolved in the solvent to give a solution with a concentration of at least about 0.5% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

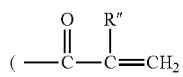

in which R" is hydrogen or methyl), allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

The term "(meth)acrylamido" refers to a group of

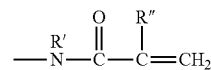

in which R' is hydrogen or $C_1$-$C_4$-alkyl and R" is hydrogen or methyl.

The term "(meth)acryloxy" refers to a group of

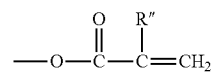

in which R" is hydrogen or methyl.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "blending vinylic monomer" refers to a vinylic monomer capable of dissolving both hydrophilic and hydrophobic components of a polymerizable composition to form a solution.

A "macromer" or "prepolymer" refers to a compound or polymer that contains ethylenically unsaturated groups and has an average molecular weights greater than 700 Daltons.

A "polymer" means a material formed by polymerizing/crosslinking one or more vinylic monomers, macromers and/or prepolymers.

"Molecular weight" of a polymeric material (including monomeric or macromeric materials), as used herein, refers to the number-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxy (—COOH), —NH$_2$, sulfhydryl, $C_1$-$C_4$ alkyl, $C_1$-$C_4$ alkoxy (—OR'), $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

As used herein, the term "multiple" refers to three or more.

A "vinylic crosslinker" refers to a compound having at least two ethylenically-unsaturated groups. A "vinylic crossliking agent" refers to a compound with two or more ethylenically unsaturated groups and with molecular weight less than 700 Daltons.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "polymerizable UV-absorbing agent" or "UV-absorbing vinylic monomer" refers to a compound comprising an ethylenically-unsaturated group and a UV-absorbing moiety.

A "UV-absorbing moiety" refers to an organic functional group which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surfaces of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Patent Application Publication Nos. 2011/0134387, 2012/0026457 and 2013/0118127 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by Sessile Drop), which is obtained by averaging measurements of at least 3 individual contact lenses.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The term "ATRP" refers to atom-transfer radical polymerization, as understood by a person skilled in the art.

As used in this application, the term "clear" in reference to a lens-forming composition means that the lens-forming composition is a transparent solution or liquid mixture (i.e., having a light transmissibility of 85% or greater, preferably 90% or greater in the range between 400 to 700 nm).

The invention generally is related to a class of amphiphilic branched macromers and the uses thereof. An amphiphilic branched polydiorganosiloxane macromer of the invention comprises a polydiorganosiloxane polymer chain and two terminal groups free of any ethylenically unsaturated group, wherein the polydiorganosiloxane polymer chain comprises (1) at least 5 dimethylsiloxane units in a consecutive sequence, (2) at least two first siloxane units each having methyl as one of the two substituents of each first siloxane unit and one first organic radical having one sole (meth)acryloyl group as the other substituent, (3) at least one second siloxane unit having methyl as one of the two substituents of the second siloxane unit and one second organic radical, which is free of any ethylenically unsaturated group and comprises one or more hydrophilic groups or polymer chains, as the other substituent.

The present invention, in one aspect, provides an amphiphilic branched polydiorganosiloxane macromer. The amphiphilic branched macromer of the invention comprises a polydiorganosiloxane polymer chain terminated with two terminal groups free of any ethylenically unsaturated group, wherein the linear polydiorganosiloxane polymer chain comprises:

(1) at least 5 dimethylsiloxane units in a consecutive sequence;

(2) at least two first siloxane units of

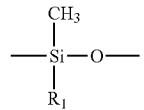

in which $R_1$ is a monovalent radical of formula (I); and

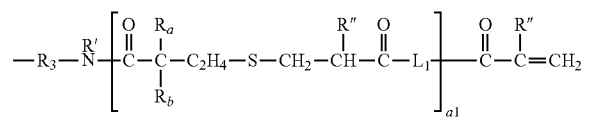

(3) at least one second siloxane unit

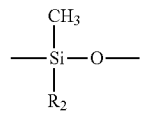

in which $R_2$ is a monovalent radical of formula (II), (III) or (IV)

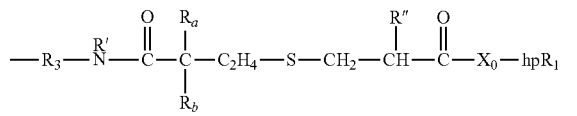

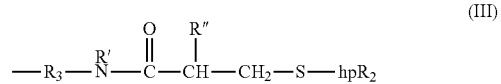

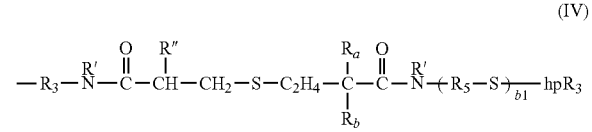

in which a1 and b1 independent of each other are 0 or 1,

R' is hydrogen or $C_1$-$C_4$ alkyl,

R" is hydrogen or methyl, $R_a$ is hydrogen or methyl (preferably hydrogen), $R_b$ is hydrogen, $C_1$-$C_3$ alkyl, acetyl, or $C_2$-$C_4$ alkanoylamino which optionally has a carboxyl group (preferably acetylamino, propionylamino or butyrylamino, more preferably acetylamino or propionylamino, even more preferably acetylamino), $R_3$ and $R_5$ independent of each other are a $C_1$-$C_6$ alkylene divalent radical, $X_0$ is oxygen or NR', $L_1$ is a divalent radical of any one of (a) —NR$_4$— in which $R_4$ is hydrogen or $C_1$-$C_3$ alkyl,

(c) —NR"—L$_2$—NR"— in which R" is hydrogen or methyl and L$_2$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O—L$_3$—O— in which L$_3$ is a $C_1$-$C_6$ alkylene divalent radical, a divalent radical of

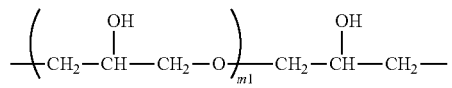

in which m1 is 1 or 2, a divalent radical of

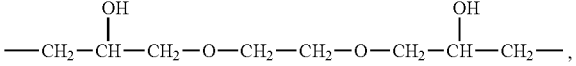

a divalent radical of

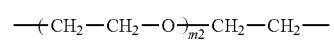

in which m2 is an integer of 1 to 5, a divalent radical of

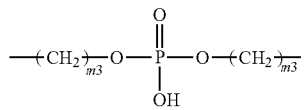

in which m3 is 2 or 3, or a substituted $C_3$-$C_8$ alkylene divalent radical having a hydroxyl group or phosphonyloxy group, $hpR_1$ is hydroxyethoxy, hydroxypropyloxy, 2-hydroxypropyloxy, 1,2-dihydroxypropyloxy, dimethylaminoethoxy, dimethylamino, hydroxyethylamino, hydroxypropylamino, tris(hydroxymethyl)methylamino, dimethylaminoethylamino, or trimethylammonioethylphophonyloxyethoxy

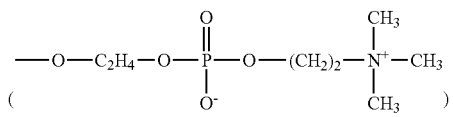

group, a monovalent radical of

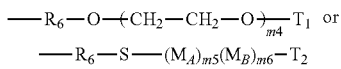

in which $X_o$ is oxygen or NH, m4 is an integer of 2 to 40, m5 and m6 independent of each other are integer of 0 to 40 while (m5+m6)≥3, $T_1$ and $T_2$ independent of each other are hydrogen or $C_1$-$C_4$ alkyl, $R_6$ is a direct bond or a $C_2$-$C_6$ alkylene divalent radical, $M_A$ and $M_B$ independent of each other are a monomeric unit of a vinylic monomer selected from the group consisting of (meth)acrylamide, N,N-dimethyl (meth)acrylamide, N-vinylpyrrolidone, N-vinyl-N-methyl acetamide, N-vinyl formamide, N-vinyl acetamide, N-methyl-3-methylene-2-pyrrolidone, glycerol methacrylate, N-hydroxyethyl (meth)acrylamide, N-hydroxypropyl (meth)acrylamide, hydroxyethyl (meth)acrylate, hydroxypropyl (meth)acrylate, trimethylammonioethylphophonyloxyethyl (meth)acrylate, $C_1$-$C_4$-alkoxy polyethylene glycol (meth)acrylate having a weight average molecular weight of up to 1500 Daltons, vinyl alcohol, and mixtures thereof, $hpR_2$ is a $C_2$-$C_4$ alkyl having 2 to 3 hydroxy groups or a monovalent radical of $$-\!\!\!-\!\!(CH_2-CH_2-O)_{\overline{m4}}T_1 \quad \text{or} \quad -\!\!\!-\!\!(M_A)_{m5}(M_B)_{m6}-T_3$$

in which $T_3$ is $C_1$-$C_6$ alkyl which is substituted with at least one of cayno, phenyl, carboxy and carboxylate group, $hpR_3$ is a monovalent radical of $$-\!\!\!-\!\!(M_A)_{m5}(M_B)_{m6}-T_2.$$

In a preferred embodiment, an amphiphilic branched polydiorganosiloxane macromer of the invention further comprises at least one unit of formula (V)

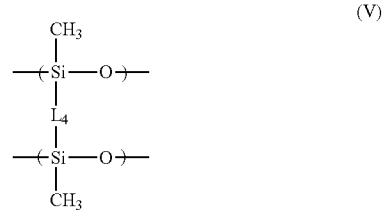

in which $L_4$ is a divalent radical of formula (VI)

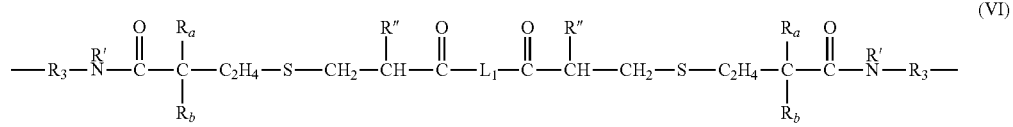

in which R', R", $R_a$, $R_b$, $R_3$, and $L_1$ are as defined above.

The term "alkanoylamino" or "acylamino" refers to a monovalent radical of

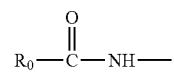

in which $R_0$ is an unsubstituted or substituted alkyl group.

In accordance with a preferred embodiment, an amphiphilic polydiorganosiloxane macromer of the invention has an average molecular weight of preferably at least about 3000 Daltons, more preferably from about 4000 Daltons to about 200,000 Daltons, even more preferably from about 5000 Daltons to about 100,000 Dalton, most preferably from about 7000 Daltons to about 50,000 Daltons.

An amphiphilic polydiorganosiloxane macromer of the invention, in which $R_1$ is a monovalent radical of formula (I) in which a1 is 0 whereas $R_2$ is a monovalent radical of formula (III) or (IV), can be prepared according to procedures similar to those shown in Scheme 1.

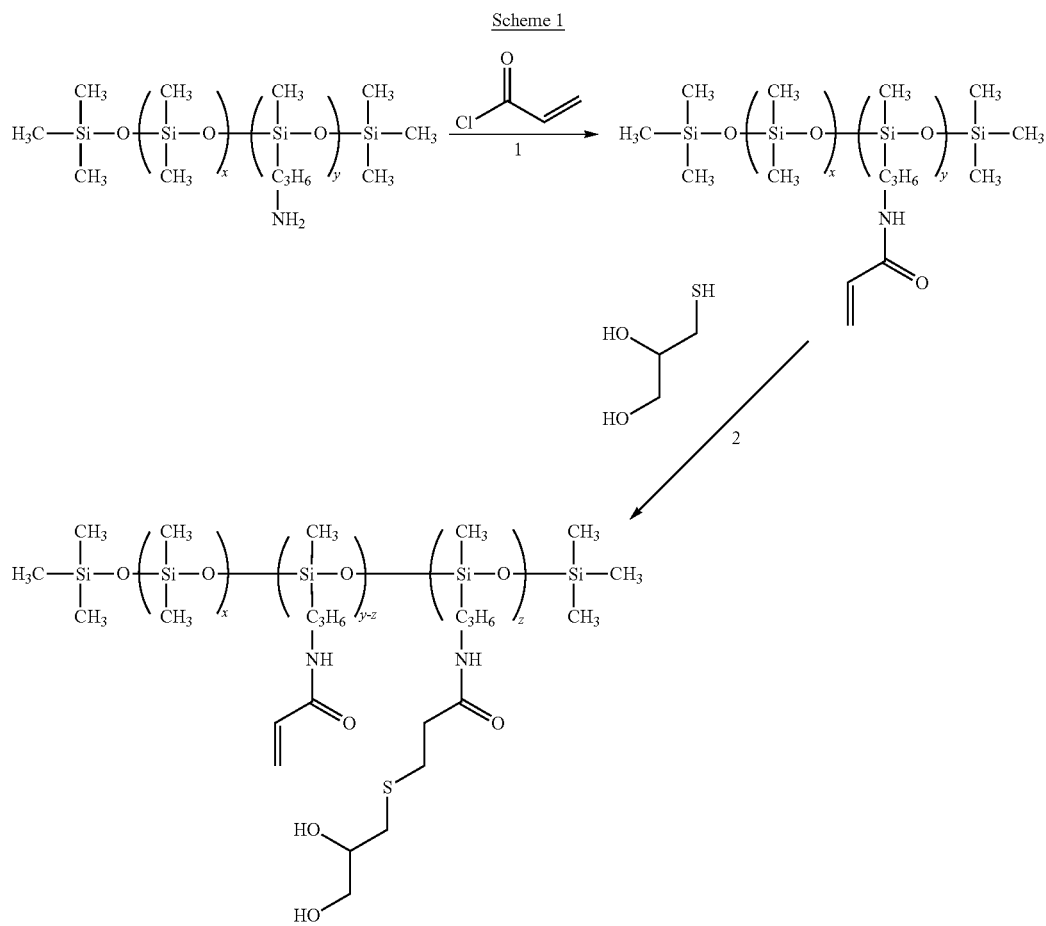

Scheme 1

Scheme 1 illustrates how to prepare a preferred amphiphilic branched polydiorganosiloxane macromer of the invention in a two-step reaction process. In the first step, a polydiorganosiloxane with pendant aminoalkyl substituents is reacted with a (meth)acryloyl halide (e.g., acryloyl chloride shown in Scheme 1), according to the well-known coupling reaction between amine and acid halide, to obtain a polydiorganosiloxane with pendant (meth)acrylamidoalkyl substituents. In the second step, the resultant polydiorganosiloxane with pendant (meth)acrylamidoalkyl substituents is reacted with a mercaptan having 2 to 4 hydroxy groups (e.g., 3-mercaptopropane-1,2-diol shown in Scheme 1) at a x/z molar equivalent ratio according to the well-known Thiol-Michael Addition reaction, to obtain a preferred amphiphilic branched polydiorganosiloxane macromer of the invention.

It is understood that, in step 1 of Scheme 1, (meth)acryloyl halide can be replaced by methacrylic acid or acrylic acid while using N-hydroxysuccinimide and a coupling agent, carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl) carbodiimide, diisopropyl carbodiimide, or mixtures thereof), as known to a person skilled in the art. Also, a polydiorganosiloxane with pendant aminoalkyl substituents can be replaced with a polydiorganosiloxane with pendant alkylaminoalkyl substituents.

Another preferred amphiphilic branched polydiorganosiloxane macromer of the invention can be obtained by replacing, in the second step of Scheme 1, a mercaptan having 2 to 4 hydroxy groups with a mono-thiol-terminated hydrophilic polymer, such as, e.g., monothiol-terminated polyethylene glycol $$HS-(CH_2-CH_2-O)_{m4}-T_1,$$

or a monothiol-terminated hydrophilic polymer of $$HS-(M_A)_{m5}(M_B)_{m6}-T_3$$

which is obtained by first RAFT (Reversible-Addition-Fragmentation chain Transfer) polymerization of one or more hydrophilic vinylic monomers in the presence of RAFT agent and then by removing/converting the active RAFT end group to a thiol group (—SH) by using a nucleophile, e.g., ethylene diamine, (e.g., heating the polymer with ethylene diamine in a solvent for a period of time at a temperature, e.g., at 40° C.), as known to a person skilled in the art.

Another preferred amphiphilic branched polydiorganosiloxane macromer of the invention (in which a monovalent radical of formula (IV)) can be obtained by replacing, in the second step of Scheme 1, a mercaptan having 2 to 4 hydroxy groups with the reaction product of N-acetylhomocysteine thiolactone with a mono-amino-terminated hydrophilic polymer (such as, e.g., a monoamino-terminated polyethylene glycol

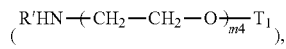

or a monoamino-terminated hydrophilic polymer of

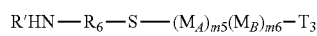

which is obtained by thermally-induced or photoinduced free-radical polymerization of one or more hydrophilic vinylic monomers in the presence of an amino-containing mercaptan as chain transfer agent, as known to a person skilled in the art). The reaction between N-acetylhomocysteine thiolactone and a monothiol-terminated hydrophilic polymer is illustrated in scheme 2.

Scheme 2

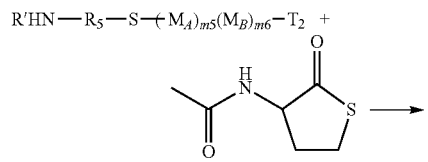

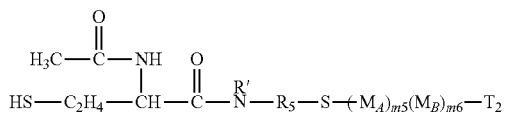

It is understood that, in Scheme 2 above, N-acetyl homocysteine thiolactone can be substituted with any thiolactone to obtain a hydrophilic copolymer of the invention. Examples of preferred commercially-available thiolactone include without limitation 4-butyrothiolactone (or dihydro-2(3H)-thiophenone), 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 3-acetyldihydro-2(3H)-thiophenone, N-acetyl homocysteine thiolactone, N-propionyl homocysteine thiolactone, N-butyryl homocysteine thiolactone, and N-carboxybutyryl homocysteine thilactone (or 4-oxo-4-[(tetrahydro-2-oxo-3-thienyl)amino]-butanoic acid).

An amphiphilic polydiorganosiloxane macromer of the invention, in which $R_1$ is a monovalent radical of formula (I) in which a1 is 1 whereas $R_2$ is a monovalent radical of formula (II), can be prepared according to a three-step process illustrated in Scheme 3.

Scheme 3

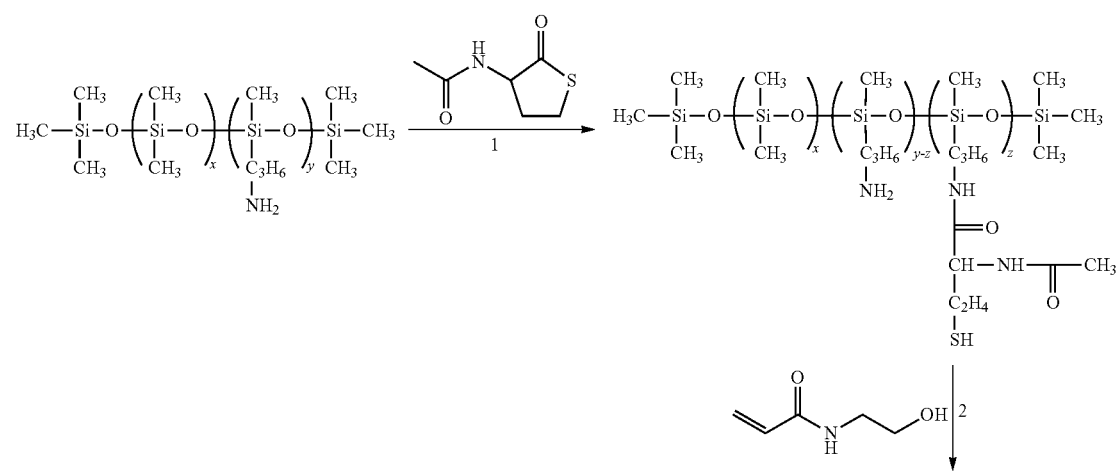

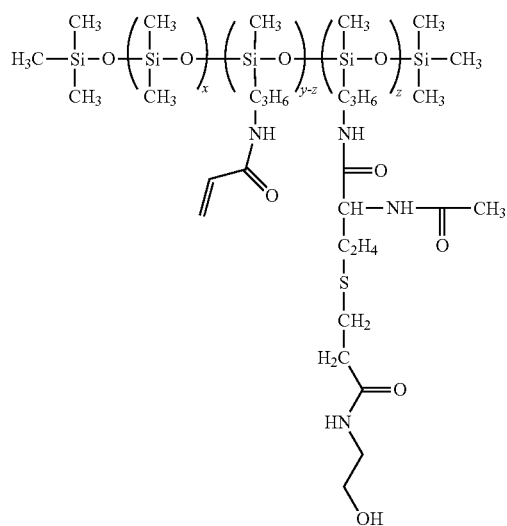
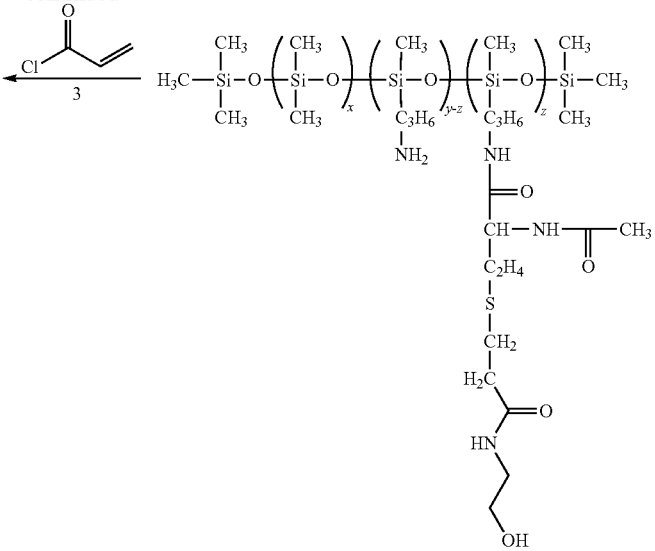

In the first step, a polydiorganosiloxane with pendant aminoalkyl substituents is reacted with N-acetylhomocysteine thiolactone (or any one of preferred commercially-available thiolactone described above) at y/z molar equivalent ratio to obtain a polydiorganosiloxane with pendant thiol-terminated substituents and pendant aminoalkyl substituents. In the second step, the resultant polydiorganosiloxane with pendant thiol-terminated substituents and pendant aminoalkyl substituents is reacted with a hydrophilic (meth)acrylate or (meth)acrylamide monomer (e.g., selected from the group consisting of N,N-dimethyl (meth)acrylamide, N-vinylpyrrolidone, N-vinyl-N-methyl acetamide, N-vinyl formamide, N-vinyl acetamide, N-methyl-3-methylene-2-pyrrolidone, glycerol methacrylate, N-hydroxyethyl (meth)acrylamide, N-hydroxypropyl (meth)acrylamide, hydroxyethyl (meth)acrylate, hydroxypropyl (meth)acrylate, trimethylammonioethylphophonyloxyethyl (meth)acrylate (or 2-(meth)acryloyloxyethyl phosphorylcholine, MPC), $C_1$-$C_4$-alkoxy polyethylene glycol (meth)acrylate having a weight average molecular weight of up to 1500 Daltons), according to Thiol-Michael Addition reaction, to obtain a polydiorganosiloxane with pendant hp$R_1$-containing hydrophilic substituent substituents and pendant aminoalkyl substituents. In the third step, the resultant polydiorganosiloxane with pendant hp$R_1$-containing hydrophilic substituent substituents and pendant aminoalkyl substituents is reacted with a (meth)acryloyl halide, to obtain a preferred amphiphilic branched polydiorganosiloxane macromer of the invention.

It is understood that, in step 3 of Scheme 3, (meth)acryloyl halide can be replaced by methacrylic acid or acrylic acid while using N-hydroxysuccinimide and a coupling agent, carbodiimide (e.g., EDC), as known to a person skilled in the art. Also, a polydiorganosiloxane with pendant aminoalkyl substituents can be replaced with a polydiorganosiloxane with pendant alkylaminoalkyl substituents. Further, in step 2 of Scheme 3, a hydrophilic (meth)acrylate or (meth)acrylamide monomer can be replaced by a mono-(meth)acryloyl-terminated hydrophilic polymer with a mono-amino-terminated hydrophilic polymer (such as, e.g., a mono(meth)acryloyl-terminated polyethylene glycol

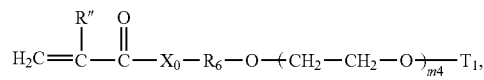

or a mono(meth)acryloyl-terminated hydrophilic polymer of

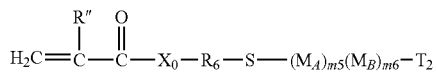

which is obtained by first thermally-induced or photoinduced free-radical polymerization of one or more hydrophilic vinylic monomers (selected from the group consisting of (meth)acrylamide, N,N-dimethyl (meth)acrylamide, N-vinylpyrrolidone, N-vinyl-N-methyl acetamide, N-vinyl formamide, N-vinyl acetamide, N-methyl-3-methylene-2-pyrrolidone, glycerol methacrylate, N-hydroxyethyl (meth)acrylamide, N-hydroxypropyl (meth)acrylamide, hydroxyethyl (meth)acrylate, hydroxypropyl (meth)acrylate, trimethylammonioethylphophonyloxyethyl (meth)acrylate, $C_1$-$C_4$-alkoxy polyethylene glycol (meth)acrylate having a weight average molecular weight of up to 1500 Daltons, vinyl alcohol, and mixtures thereof) in the presence of an amino-containing or hydroxy-containing mercaptan as chain transfer agent, as known to a person skilled in the art to obtain a mono-amino-terminated or monohydroxy-terminated hydrophilic polymer, and then reacting the resultant mono-amino-terminated or monohydroxy-terminated hydrophilic polymer with (meth)acryloyl chloride.

An amphiphilic branched polydiorganosiloxane macromer of the invention, in which $R_1$ is a monovalent radical of formula (I) in which a1 is 1 whereas $R_2$ is a monovalent radical of formula (II), can be prepared according to a three-step process illustrated in Scheme 4.

Scheme 4
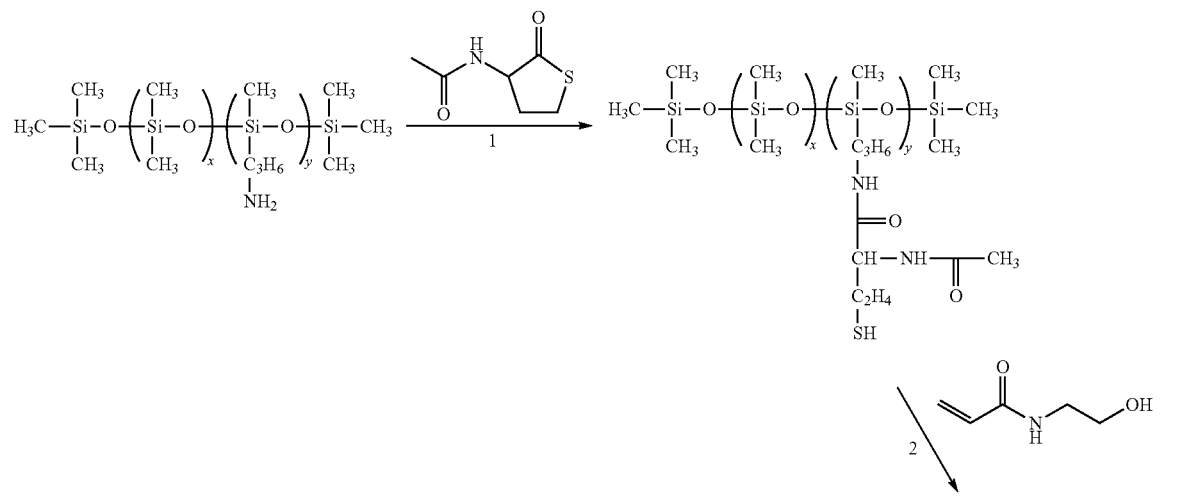
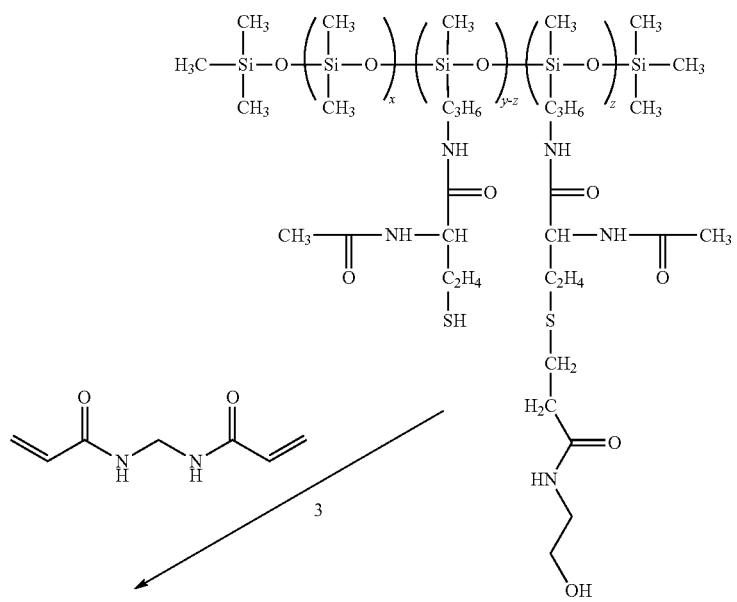

-continued
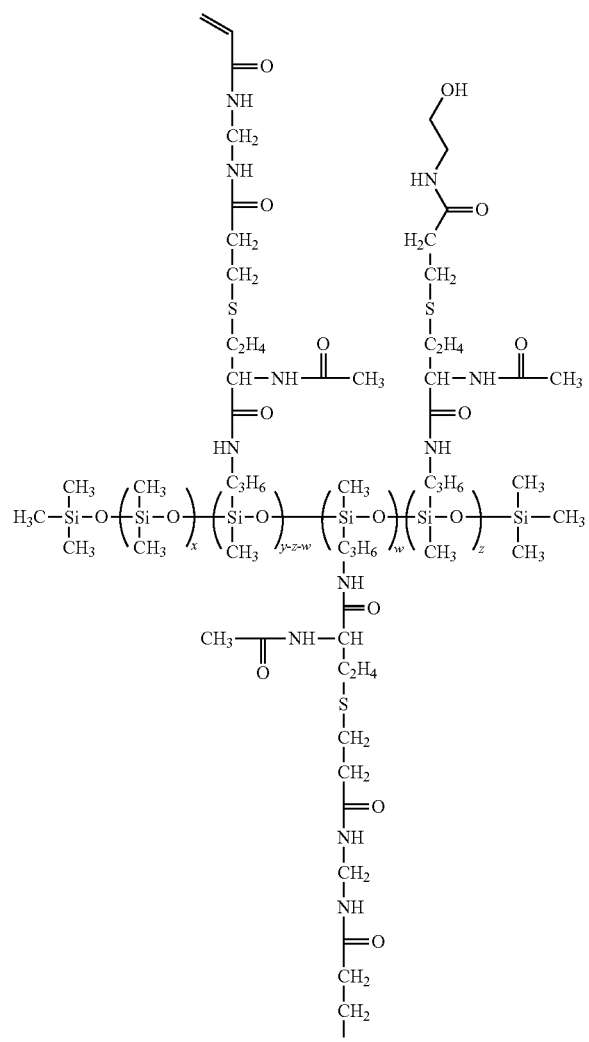

-continued

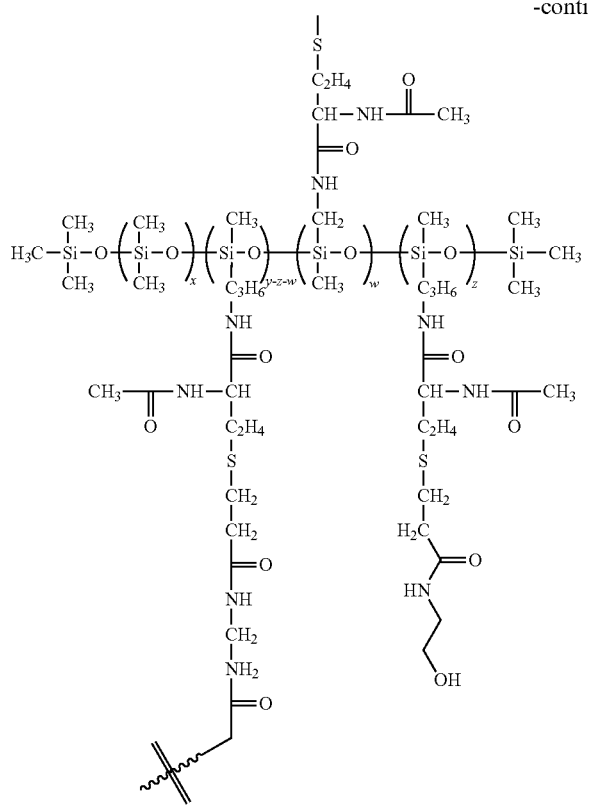

In the first step, a polydiorganosiloxane with pendant aminoalkyl substituents is reacted with N-acetylhomocysteine thiolactone (or any one of preferred commercially-available thiolactone described above) to obtain a polydiorganosiloxane with pendant thiol-terminated substituents. In the second step, the resultant polydiorganosiloxane with pendant thiol-terminated substituents is reacted with a hydrophilic (meth)acrylate or (meth)acrylamide monomer (e.g., any one described above for Scheme 3) at y/z molar equivalent, according to Thiol-Michael Addition reaction, to obtain a polydiorganosiloxane with pendant $hpR_1$-containing hydrophilic substituent substituents and pendant aminoalkyl substituents. In the third step, the resultant polydiorganosiloxane obtained in step 2 is reacted with a di-(meth)acrylate or di-(meth)acrylamide crosslinking agent at a desired molar equivalent ratio, according to Thiol-Michael Addition reaction, to obtain a preferred amphiphilic branched polydiorganosiloxane macromer of the invention. A person skilled in the art know how to control the molar equivalent ratio of the two reactants to obtain a preferred amphiphilic branched polydiorganosiloxane macromer of the invention (in which R2 is a monovalent radical of formula (II) comprising a desired number (e.g., from 0 to 10) of repeating units of formula (V)).

It is understood that, in step 2 of Scheme 4, a hydrophilic (meth)acrylate or (meth)acrylamide monomer can be replaced by a mono-(meth)acryloyl-terminated hydrophilic polymer with a mono-amino-terminated hydrophilic polymer (such as, e.g., a mono(meth)acryloyl-terminated polyethylene glycol

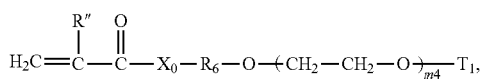

or a mono(meth)acryloyl-terminated hydrophilic polymer of

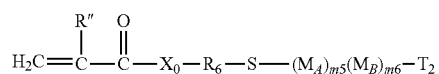

(as described above for Scheme 3).

Any polydiorganosiloxanes with pendant aminoalkyl or alkylaminoalkyl substituents can be used in the invention. Such diorganosiloxanes can be obtained from commercial sources (e.g., from Gelest, Inc, Shin-Etsu, or Fluorochem).

Any mercaptans having 2 to 4 hydroxyl groups can be used in the invention. Examples of preferred mercaptans having 2 to 4 hydroxyl groups include without limitation 1-mercaptoethane-1,2-diol, 2-mercaptopropane-1,3-diol, 3-mercaptopropane-1,2-diol, 3-mercaptobutane-1,2-diol, 1-mercaptobutane-2,3-diol, 4-mercapto-1,2,3-butanetriol, and 2-mercapto-6-methylol-tetrahydropyran-3,4,5-triol.

A "RAFT agent" refers to a compound of

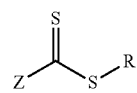

in which R is a leaving group and has its traditional meanings as understood by one skilled in the art; Z is an activating group and has its traditional meanings as understood by one skilled in the art. Any RAFT agents can be used in the invention. RAFT agents can be classified into the following classes: dithiobenzoates, trithiocarbonates, xanthates, and dithiocarbamates. Examples of preferred RAFT agents include without limitation 4-Cyano-4-(dodecyl-sulfanylthiocarbonyl)sulfanylpentanoic acid, S-Cyanomethyl-S-dodecyltrithiocarbonate, S-(2-Cyano-2-propyl)-S-dodecyltrithiocarbonate, 3-benzylsulfanylthiocarbonylsulfanylpropionic acid, cumyl dithiobenzoate, 2-cyanoprop-2-yl dithiobenzoate (i.e., cyanoisopropyl dithiobenzoate), 4-thiobenzoylsulfanyl-4-cyanopentanoic acid (TCA), S,S'-bis(α, α'-dimethyl-α"-acetic acid)-trithiocarbonate (BATC), and mixtures thereof.

After RAFT polymerization of one or more hydrophilic vinylic monomer, a resultant polymer typically comprises one active RAFT groups

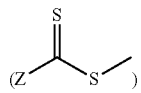

as one of the two terminal groups and R as the other terminal group. The active RAFT group in a resultant polymer can be removed by using a nucleophile, e.g., ethylene diamine, (e.g., heating the polymer with ethylene diamine in a solvent for a period of time at a temperature, e.g., at 40° C.), thereby converting the active RAFT end group to a thiol group (—SH).

Examples of preferred primary and secondary amino-containing chain transfer agents include without limitation 2-mercaptoethylamine, 2-mercaptopropylamine, 3-mercaptopropylamine, 2-mercaptobutylamine, 3-mercaptobutylamine, 4-mercaptobutylamine, 5-mercaptopentylamine, 6-mercaptohexylamine, N-methylaminoethanethiol, N-ethylaminoethanethiol, N-methylaminopropanethiol, N-ethylaminopropanethiol, N-methylaminobutanethiol, and N-ethylaminobutanethiol.

Any monoamino-terminated polyethylene glycols, monothio-terminated polyethylene glycols, polyethylene glycol alkyl ether, any mono-(meth)acrylate-terminate polyethylene glycols, any mono-(meht)acrylamido-terminated polyethylene glycols can be used in the invention. Such monofunctional polyethylene glycols can be obtained from commercial sources (e.g., Sigma, Polysciences, etc.).

Any di-(meth)acrylate and di-(meth)acrylamide cross-linking agents (i.e., ones having two (meth)acryloyl groups) can be used in the invention. Examples of preferred di-(meth)acrylate and di-(meth)acrylamide crosslinking agents include without limitation diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phophonyloxypropylene bis(meth)acrylamide), piperazine diacrylamide (or 1,4-bis(meth)acryloyl piperazine), ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl]phosphate, trimethylolpropane di-(meth)acrylate, and 3,4-bis[(meth)acryloyl]tetrahydrofuan.

In another preferred embodiment, an amphiphilic polydiorganosiloxane macromer of the invention can be defined by formula (VII)

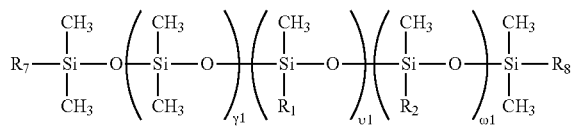

in which $R_1$ and $R_2$ are as defined above, $\gamma1$ is an integer of from 5 to 100, $\upsilon1$ is an integer of from 2 to 6, and $\omega1$ is an integer of from 1 to 20, $R_7$ and $R_8$ independent of each other are $C_1$-$C_{12}$ alkyl.

In another preferred embodiment, an amphiphilic polydiorganosiloxane macromer of the invention comprises two or more polydiorganosiloxane polymer chains, wherein each pair of polydiorganosiloxane polymer chains is connected at one siloxane unit of each polydiorganosiloxane polymer chains through at least one linkage of formula (VI)

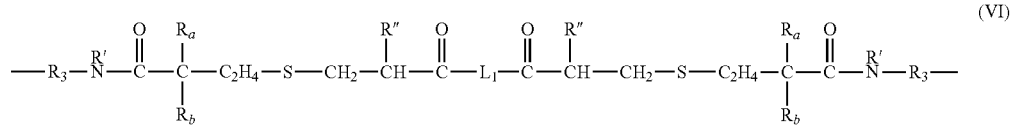

in which R', R", $R_a$, $R_b$, $R_3$, and $L_1$ are as defined above, wherein each polydiorganosiloxane polymer chain is terminated with two terminal group free of ethylenenically unsaturated group and comprises at least 5 dimethylsiloxane units in a consecutive sequence, at least two first siloxane units of

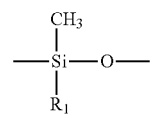

in which $R_1$ is defined above, and at least one second siloxane unit

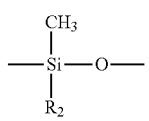

in which $R_2$ is defined above.

An amphiphilic branched polydiorganosiloxane macromer of the invention as described above can find particular use in preparing a polymer, preferably a silicone hydrogel polymeric material, which is another aspect of the invention. A person skilled in the art knows how to prepare a polymer or a silicone hydrogel polymeric material from a polymerizable composition according to any known polymerization mechanism.

In another aspect, the invention provides a silicone hydrogel contact lens comprising a crosslinked polymeric material comprising: units of an amphiphilic branched polydiorganosiloxane macromer of the invention as described above, wherein the silicone hydrogel contact lens, when being fully hydrated, has an oxygen permeability (Dk) of at least about 70 barrers (preferably at least about 80 barrers, more preferably at least about 90 barrers, even more preferably at least about 100 barrers), a water content of from about 25% to about 70% by weight (preferably from about 30% to about 65% by weight, more preferably from about 35% to about 60% by weight, even more preferably from about 40% to about 55% by weight), an elastic modulus of from about 0.20 MPa to about 1.2 MPa (preferably from about 0.25 MPa to about 1.0 MPa, more preferably from about 0.3 MPa to about 0.9 MPa, even more preferably from about 0.4 MPa to about 0.8 MPa).

A person skilled in the art knows well how to measure the oxygen permeability, oxygen transmissibility, water content, elastic modulus, and lens diameter of silicone hydrogel contact lenses. These lens properties have been reported by all manufacturers for their silicone hydrogel contact lens products.

Various embodiments of a polydiorganosiloxane-containing amphiphilic branched macromer of the invention are described above and should be incorporated into this aspect of the invention.

In accordance with the invention, the crosslinked polymeric material of a silicone hydrogel contact lens of the invention can further comprise units of a siloxane-containing vinylic monomer, units of a hydrophobic vinylic monomer free of silicone, units of a non-silicone vinylic crosslinker, units of a UV-absorbing vinylic monomer, or a combination thereof.

Any suitable siloxane-containing vinylic monomers can be used in the invention. A class of preferred siloxane-containing vinylic monomers is those containing a tris(trialkylsiloxy)silyl group or a bis(trialkylsilyloxy)alkylsilyl group. Examples of such preferred silicone-containing vinylic monomers include without limitation 3-acrylamidopropyl-bis(trimethylsiloxy)methylsilane, 3-N-methyl acrylamidopropylbis(trimethylsiloxy)methylsilane, N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxyethoxypropyloxy-propyl-bis(trimethylsiloxy) methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate, trimethylsilylethyl vinyl carbonate, trimethylsilylmethyl vinyl carbonate, and hydrophlized siloxane-containing vinylic monomers disclosed in U.S. Pat. Nos. 9,103,965, 9,475,827, and 9,097,840 (herein incorporated by references in their entireties) which comprise at least one hydrophilic linkage and/or at least one hydrophilic chain.

Another class of preferred siloxane-containing vinylic monomers is polycarbosiloxane vinylic monomers (or carbosiloxane vinylic monomers). Examples of such polycarbosiloxane vinylic monomers or macromers are those described in U.S. Pat. Nos. 7,915,323 and 8,420,711, in US Patent Application Publication Nos. 2012/244088, 2012/245249, 2015/0309211, and 2015/0309210 (herein incorporated by references in their entireties).

A further class of preferred siloxane-containing vinylic monomers is polydimethylsiloxane-containing vinylic monomers. Examples of such polydimethylsiloxane-containing vinylic monomers are mono-(meth)acryloyl-terminated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane), mono-(meth)acrylamido-terminated polydimethylsiloxanes of various molecular weight, or combinations thereof.

In accordance with the invention, a siloxane-containing vinylic monomer is preferably 3-(meth)acryloxy-2-hydroxypropyloxy)propylbis(trimethylsiloxy)methylsilane, 3-(meth)acryloxyethoxypropyloxypropylbis(trimethylsiloxy)methylsilane, 3-(meth)acrylamidopropyl-bis(trimethylsiloxy)methylsilane, 3-N-methyl (meth)acrylamidopropylbis(trimethylsiloxy) methylsilane, mono-(meth)acryloyl-terminated polydimethylsiloxanes of various molecular weight, mono-(meth)acrylamido-terminated polydimethylsiloxanes of various molecular weight, or a combination thereof.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred non-silicone crosslinkers include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phosphonyloxypropylene bis(meth)acrylamide), piperazine diacrylamide (or 1,4-bis(meth)acryloyl piperazine), vinyl methacrylate, allylmethacrylate, allylacrylate, N-allyl-methacrylamide, N-allyl-acrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, a product of diamine (preferably selected from the group consisting of N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, isophorone diamine, and combinations thereof) and epoxy-containing vinylic monomer (preferably selected from the group consisting of glycidyl (meth)acrylate, vinyl glycidyl ether, allyl glycidyl ether, and combinations thereof), combinations thereof.

Any suitable UV-absorbing vinylic monomers and UV/HEVL-absorbing vinylic monomers can be used in a polymerizable composition for preparing a polymer of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acryloyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS#96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS#1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS#83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

A silicone hydrogel contact lens can be prepared from a lens-forming composition according to a method of the invention which is another aspect of the invention.

In a further aspect, the present invention provides a method for producing silicone hydrogel contact lenses. The method comprises the steps of: preparing a lens-forming composition which is clear at room temperature and optionally but preferably at a temperature of from about 0 to about 4° C., wherein the lens-forming composition comprises at least one amphiphilic branched polydiorganosiloxane macromer of the invention as described above and at least one free-radical initiator; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa.

In accordance with the invention, a free-radical initiator can be a thermal initiator or hotoinitiator.

Suitable thermal polymerization initiators are known to the skilled artisan and comprise, for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis (isobutyronitrile) (AIBN), 1,1-azodiisobutyramidine, 1,1'-azo-bis (1-cyclohexanecarbonitrile), 2,2'-azo-bis(2,4-dimethyl-valeronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

In accordance with the invention, the lens-forming composition can further comprise other components, such as, a siloxane-containing vinylic monomer, a hydrophilic vinylic monomer, a hydrophobic vinylic monomer, a non-silicone vinylic crosslinker, a UV-absorbing vinylic monomer, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Various embodiments of an amphiphilic branched polydiorganosiloxane macromer of the invention, a siloxane-containing vinylic monomer, a hydrophobic vinylic monomer, a UV-absorbing vinylic monomer, and a non-silicone vinylic crosslinker are described above for the aspects of the invention and should be incorporated into this aspect of the invention.

Examples of preferred hydrophilic vinylic monomers include without limitation N-vinylpyrrolidone, N,N-dimethyl (meth)acrylamide, (meth)acrylamide, hydroxylethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a weight average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, and combinations thereof. Preferably, the hydrophilic vinylic monomer is a hydrophilic N-vinyl monomer, such as, N-vinylpyrrolidone, N-vinyl-N-methyl acetamide, N-vinyl formamide, N-vinyl acetamide, N-vinyl isopropylamide, or combinations thereof. Even more preferably, the hydrophilic vinylic monomer is N-vinylpyrrolidone, N-vinyl-N-methyl acetamide, or combinations thereof.

In a preferred embodiment, the lens-forming composition further comprises a hydrophilic N-vinyl monomer. More preferably, the hydrophilic N-vinyl monomer is N-vinylpyrrolidone, N-vinyl-N-methyl acetamide, N-vinyl formamide, N-vinyl acetamide, N-vinyl isopropylamide, or combinations thereof; even more preferably is N-vinylpyrrolidone, N-vinyl-N-methyl acetamide, or combinations thereof.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization. Any Germanium-based Norrish Type I photoinitiators can be used in this invention, so long as they are capable of initiating a free-radical polymerization under irradiation with ium-based Norrish Type I photoinitiators are acylgermanium compounds described in U.S. Pat. No. 7,605,190 (herein incorporated by reference in its entirety).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosllinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 500,000, more preferably from 10,000 to 300,000, even more preferably from 20,000 to 100,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In a preferred embodiment, the lens-forming composition comprises an organic solvent.

Example of suitable solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In a particular preferred embodiment, a lens-forming composition is a solution of all the desirable components dissolved in 1,2-propylene glycol, a polyethyleneglycol having a molecular weight of about 400 Daltons or less, or a mixture thereof.

In another preferred embodiment, the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof. Preferably, the blending vinylic monomer is methylmethacrylate.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the lens-forming formulation (or composition) can be introduced (dispensed) into a cavity formed by a mold according to any known methods.

After the lens-forming composition is dispensed into the mold, it is polymerized to produce a contact lens. Cross-linking may be initiated thermally or actinically, preferably by exposing the lens-forming composition in the mold to a spatial limitation of actinic radiation to crosslink the polymerizable components in the lens-forming composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

In a preferred embodiment, the resultant silicone hydrogel contact lens is extracted with water or an aqueous solution.

In another preferred embodiment, the mold is a reusable mold and the lens-forming composition is cured (i.e., polymerized) actinically under a spatial limitation of actinic radiation to form a silicone hydrogel contact lens. Examples of preferred reusable molds are those disclosed in U.S. Pat. Nos. 6,627,124, 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, and combinations thereof.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. An amphiphilic branched polydiorganosiloxane macromer, comprising a polydiorganosiloxane polymer chain terminated with two terminal groups free of any ethylenically unsaturated group, wherein the linear polydiorganosiloxane polymer chain comprises:
   (1) at least 5 dimethylsiloxane units in a consecutive sequence;
   (2) at least two first siloxane units of

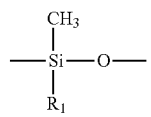

in which $R_1$ is a monovalent radical of formula (I); and

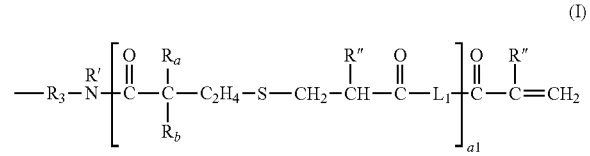

(3) at least one second siloxane unit

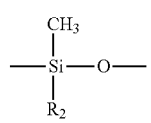

in which $R_2$ is a monovalent radical of formula (II), (III) or (IV)

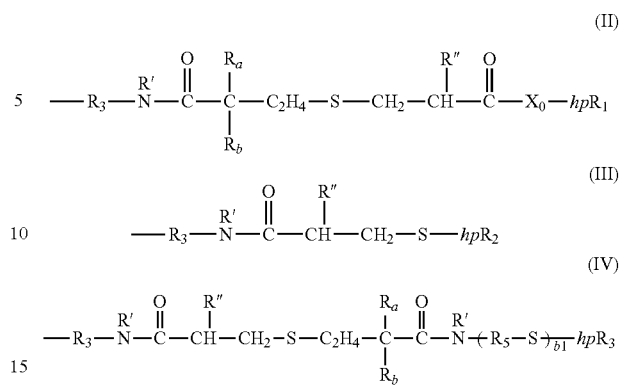

in which
   a1 and b1 independent of each other are 0 or 1,
   R' is hydrogen or $C_1$-$C_4$ alkyl,
   R" is hydrogen or methyl,
   $R_a$ is hydrogen or methyl (preferably hydrogen), and $R_b$ is hydrogen, $C_1$-$C_3$ alkyl, acetyl, or $C_2$-$C_4$ alkanoylamino (e.g., acetylamino, propionylamino, butyrylamino) which optionally has a carboxyl group (preferably acetylamino, propionylamino or butyrylamino, more preferably acetylamino or propionylamino, even more preferably acetylamino),
   $R_3$ and $R_5$ independent of each other are a $C_1$-$C_6$ alkylene divalent radical,
   $X_0$ is oxygen or NR',
   $L_1$ is a divalent radical of any one of (a) —$NR_4$— in which $R_4$ is hydrogen or $C_1$-$C_3$ alkyl,

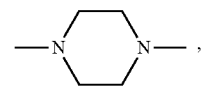

(c) —NR"—$L_2$—NR"— in which R" is hydrogen or methyl and $L_2$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O—$L_3$—O— in which $L_3$ is a $C_1$-$C_6$ alkylene divalent radical, a divalent radical of

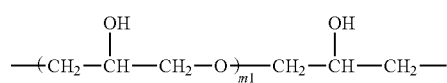

in which m1 is 1 or 2, a divalent radical of

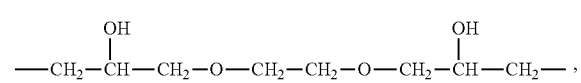

a divalent radical of

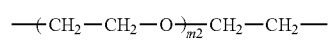

in which m2 is an integer of 1 to 5, a divalent radical of

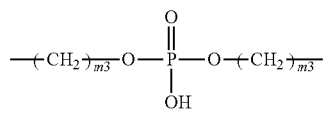

in which m3 is 2 or 3, or a substituted $C_3$-$C_8$ alkylene divalent radical having a hydroxyl group or phosphonyloxy group, $hpR_1$ is hydroxyethoxy, hydroxypropyloxy, 2-hydroxypropyloxy, 1,2-dihydroxypropyloxy, dimethylaminoethoxy, dimethylamino, hydroxyethylamino, hydroxypropylamino, tris(hydroxymethyl)methylamino, dimethylaminoethylamino, or trimethylammonioethylphophonyloxyethoxy

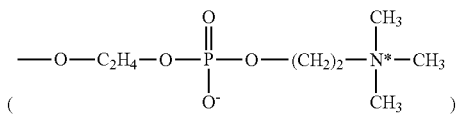

group, a monovalent radical of

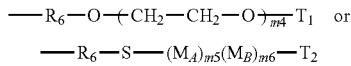

in which $X_o$ is oxygen or NH, m4 is an integer of 2 to 40, m5 and m6 independent of each other are integer of 0 to 40 while (m5+m6)≥3, $T_1$ and $T_2$ independent of each other are hydrogen or $C_1$-$C_4$ alkyl, $R_6$ is a direct bond or a $C_2$-$C_6$ alkylene divalent radical, $M_A$ and $M_B$ independent of each other are a monomeric unit of a vinylic monomer selected from the group consisting of (meth)acrylamide, N,N-dimethyl (meth)acrylamide, N-vinylpyrrolidone, N-vinyl-N-methyl acetamide, N-vinyl formamide, N-vinyl acetamide, N-methyl-3-methylene-2-pyrrolidone, glycerol methacrylate, N-hydroxyethyl (meth)acrylamide, N-hydroxypropyl (meth)acrylamide, hydroxyethyl (meth)acrylate, hydroxypropyl (meth)acrylate, trimethylammonioethylphophonyloxyethyl (meth)acrylate, $C_1$-$C_4$-alkoxy polyethylene glycol (meth)acrylate having a weight average molecular weight of up to 1500 Daltons, vinyl alcohol, and mixtures thereof, $hpR_2$ is a $C_2$-$C_4$ alkyl having 2 to 3 hydroxy groups or a monovalent radical of

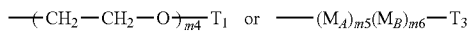

in which $T_3$ is $C_1$-$C_6$ alkyl which is substituted with at least one of cayno, phenyl, carboxy and carboxylate group, $hpR_3$ is a monovalent radical of

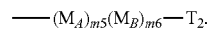

2. The amphiphilic branched polydiorganosiloxane macromer according to invention 1, wherein in formula (I) to (IV) $R_a$ is hydrogen and $R_b$ is acetylamino, propionylamino or butyrylamino.

3. The amphiphilic branched polydiorganosiloxane macromer according to invention 1, wherein in formula (I) to (IV) $R_a$ is hydrogen and $R_b$ is acetylamino or propionylamino.

4. The amphiphilic branched polydiorganosiloxane macromer according to invention 1, wherein in formula (I) to (IV) $R_a$ is hydrogen and $R_b$ is acetylamino.

5. The amphiphilic branched polydiorganosiloxane macromer according to any one of inventions 1 to 4, wherein in formula (I) a1 is zero.

6. The amphiphilic branched polydiorganosiloxane macromer according to any one of inventions 1 to 4, wherein in formula (I) a1 is 1.

7. The amphiphilic branched polydiorganosiloxane macromer according to any one of inventions 1 to 6, wherein $R_2$ is a monovalent radical of formula (II).

8. The amphiphilic branched polydiorganosiloxane macromer according to any one of inventions 1 to 6, wherein $R_2$ is a monovalent radical of formula (I).

9. The amphiphilic branched polydiorganosiloxane macromer according to any one of inventions 1 to 6, wherein $R_2$ is a monovalent radical of formula (IV).

10. The amphiphilic branched polydiorganosiloxane macromer according to invention 9, wherein b1 is zero.

11. The amphiphilic branched polydiorganosiloxane macromer according to invention 9, wherein b1 is 1.

12. The amphiphilic branched polydiorganosiloxane macromer according to any one of inventions 1 to 11, wherein the amphiphilic branched polydiorganosiloxane macromer further comprises at least one unit of formula (V)

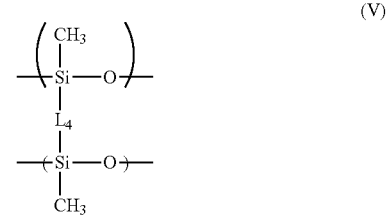

in which $L_4$ is a divalent radical of formula (VI)

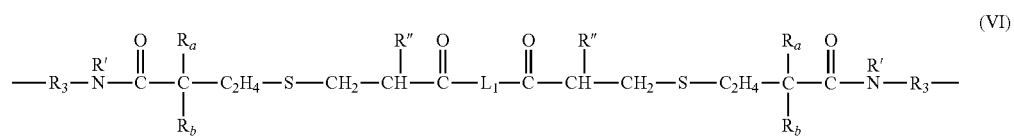

in which R', R", $R_a$, $R_b$, $R_3$, and $L_1$ are as defined in any one of inventions 1 to 4.

13. The amphiphilic branched polydiorganosiloxane macromer according to any one of inventions 1 to 11, wherein the amphiphilic branched polydiorganosiloxane macromer is defined by formula (VII)

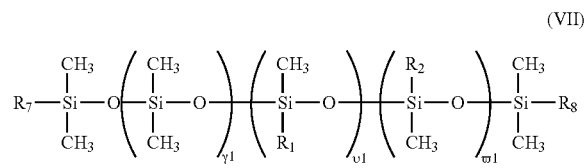

(VII)

in which $R_1$ and $R_2$ are as defined above, γ1 is an integer of from 5 to 100, υ1 is an integer of from 2 to 6, and ω1 is an integer of from 1 to 20, $R_7$ and $R_8$ independent of each other are $C_1$-$C_{12}$ alkyl.

14. The amphiphilic branched polydiorganosiloxane macromer according to any one of inventions 1 to 11, wherein the amphiphilic branched polydiorganosiloxane macromer comprises two or more polydiorganosiloxane polymer chains, wherein each pair of polydiorganosiloxane polymer chains is connected at one siloxane unit of each polydiorganosiloxane polymer chains through at least one linkage of formula (VI)

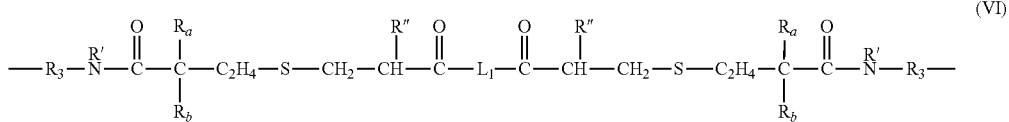

(VI)

in which R', R", $R_a$, $R_b$, $R_3$, and $L_1$ are as defined in any one of inventions 1 to 4, wherein each polydiorganosiloxane polymer chain is terminated with two terminal group free of ethylenenically unsaturated group and comprises at least 5 dimethylsiloxane units in a consecutive sequence, at least two first siloxane units of

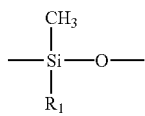

in which $R_1$ is defined above, and at least one second siloxane unit

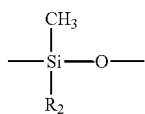

in which $R_2$ is defined any one of inventions 1 to 11.

15. The amphiphilic branched polydiorganosiloxane macromer according to any one of inventions 1 to 14, wherein the amphiphilic branched polydiorganosiloxane macromer has an average molecular weight of at least about 3000 Daltons, preferably from about 4000 Daltons to about 200,000 Daltons, more preferably from about 5000 Daltons to about 100,000 Dalton, even more preferably from about 7000 Daltons to about 50,000 Daltons.

16. A silicone hydrogel contact lens comprising a crosslinked polymeric material comprising:
    units of an amphiphilic branched polydiorganosiloxane macromer of any one of inventions 1 to 15,
wherein the silicone hydrogel contact lens, when being fully hydrated, has an oxygen permeability (Dk) of at least about 70 barrers, a water content of from about 25% to about 70% by weight, an elastic modulus of from about 0.20 MPa to about 1.2 MPa.

17. The silicone hydrogel contact lens according to invention 16, wherein the crosslinked polymeric material further comprises units of a hydrophilic vinylic monomer.

18. The silicone hydrogel contact lens according to invention 17, wherein the hydrophilic vinylic monomer is N-vinylpyrrolidone, N,N-dimethyl (meth)acrylamide, (meth)acrylamide, hydroxyethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a weight average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, or combinations thereof.

19. The silicone hydrogel contact lens according to invention 17, wherein the hydrophilic vinylic monomer is N-vinylpyrrolidone, N-vinyl-N-methyl acetamide, or combinations thereof.

20. The silicone hydrogel contact lens according to any one of inventions 15 to 17, wherein the crosslinked polymeric material further comprises units of a hydrophobic vinylic monomer free of silicone.

21. The silicone hydrogel contact lens according to any one of inventions 16 to 20, wherein the crosslinked polymeric material further comprises units of a siloxane-containing vinylic monomer, units of a non-silicone vinylic crosslinker, units of a UV-absorbing vinylic monomer, or a combination thereof.

22. A method for producing silicone hydrogel contact lenses, comprising the steps of:
    preparing a lens-forming composition which is clear at room temperature and/or at a temperature of from about 0 to about 4° C., wherein the lens-forming composition comprises at least one amphiphilic branched polydiorganosiloxane macromer of any one of invention 1 to 15 and at least one free-radical initiator;
    introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;

curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa.

23. The method according to invention 22, wherein the lens-forming composition is clear at room temperature.

24. The method according to invention 22 or 23, wherein the lens-forming composition is clear at a temperature of from about 0 to about 4° C.

25. The method according to any one of inventions 22 to 24, wherein the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof (preferably, the blending vinylic monomer is methylmethacrylate).

26. The method according to any one of inventions 22 to 24, wherein the lens-forming composition comprises an organic solvent.

27. The method according to any one of inventions 22 to 26, wherein the lens-forming composition further comprises a hydrophilic vinylic monomer.

28. The method according to invention 27, wherein the hydrophilic vinylic monomer is a hydrophilic N-vinyl monomer, preferably is N-vinylpyrrolidone, N-vinyl-N-methyl acetamide, N-vinyl formamide, N-vinyl acetamide, N-vinyl isopropylamide, or combinations thereof, even more preferably is N-vinylpyrrolidone, N-vinyl-N-methyl acetamide, or combinations thereof.

29. The method according to any one of inventions 22 to 28, wherein the lens-forming composition further comprises a non-silicone vinylic crosslinker.

30. The method according to invention 29, wherein the non-silicone vinylic crosslinker is selected from the group consisting of tetraethyleneglycol di-(meth)acrylate, triethyleneglycol di-(meth)acrylate, diethyleneglycol di-(meth)acrylate, ethyleneglycol di-(meth)acrylate, tetraethyleneglycol divinyl ether, triethyleneglycol divinyl ether, diethyleneglycol divinyl ether, ethyleneglycol divinyl ether, trimethylopropane trimethacrylate, pentaerythritol tetramethacrylate, bisphenol A dimethacrylate, vinyl methacrylate, ethylenediamine di-(meth)acrylamide, glycerol dimethacrylate, triallyl isocyanurate, triallyl cyanurate, allyl (meth)acrylate, N-allyl-(meth)acrylamide, N,N'-methylenebisacrylamide, N,N'-methylenebismethacrylamide, N,N'-ethylenebisacrylamide, N,N'-ethylenebismethacrylamide, combinations thereof (preferably selected from the group consisting of tetra(ethyleneglycol) di-(meth)acrylate, tri(ethyleneglycol) di-(meth)acrylate, ethyleneglycol di-(meth)acrylate, di(ethyleneglycol) di-(meth)acrylate, glycerol dimethacrylate, allyl (meth)acrylate, N,N'-methylene bis(meth)acrylamide, N,N'-ethylene bis(meth)acrylamide, N,N'-dihydroxyethylene bis(meth)acrylamide, triallyl isocyanurate, tetraethyleneglycol divinyl ether, triethyleneglycol divinyl ether, diethyleneglycol divinyl ether, ethyleneglycol divinyl ether, and combinations thereof).

31. The method according to any one of inventions 22 to 30, wherein the lens-forming composition further comprises a siloxane-containing vinylic monomer.

32. The method according to invention 31, wherein the siloxane-containing vinylic monomer is 3-(meth)acryloxy-2-hydroxypropyloxy)propylbis(trimethylsiloxy)methylsilane, 3-(meth)acryloxyethoxypropyloxypropylbis(trimethylsiloxy)methylsilane, 3-(meth)acrylamidopropyl-bis(trimethylsiloxy)methylsilane, 3-N-methyl (meth)acrylamidopropylbis(trimethylsiloxy) methylsilane, mono-(meth)acryloxy-terminated polydimethylsiloxanes of various molecular weight, mono-(meth)acrylamido-terminated polydimethylsiloxanes of various molecular weight, or a combination thereof.

33. The method according to any one of inventions 22 to 32, wherein the lens-forming composition further comprises a hydrophobic vinylic monomer free of silicone.

34. The method according to any one of inventions 22 to 33, wherein the lens-forming composition further comprises a UV-absorbing vinylic monomer.

35. The method according to any one of inventions 22 to 34, wherein the step of curing is carried out thermally.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

This example illustrates how to prepare an amphiphilic branched polydiorganosiloxane macromer of the invention.

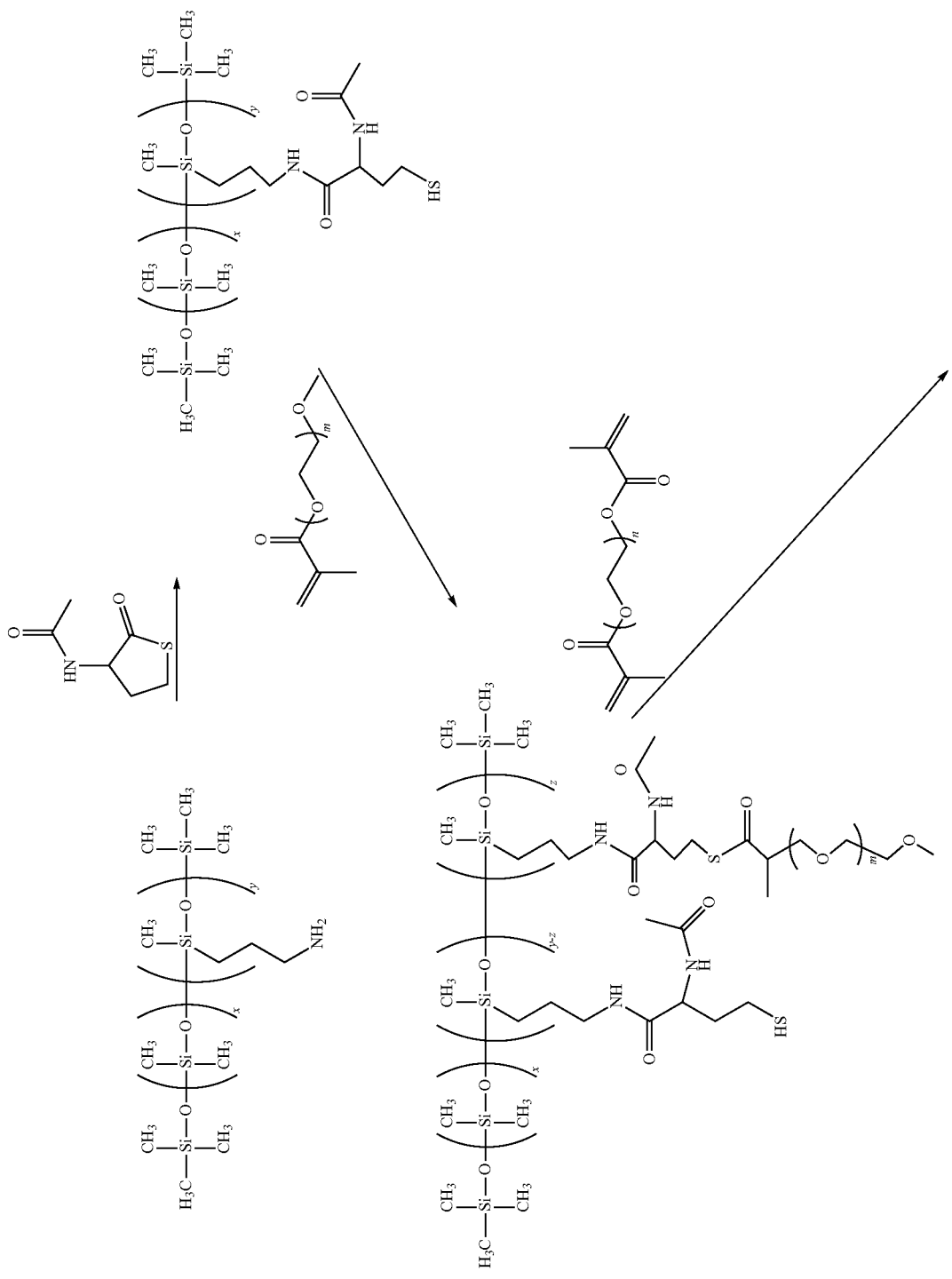

-continued
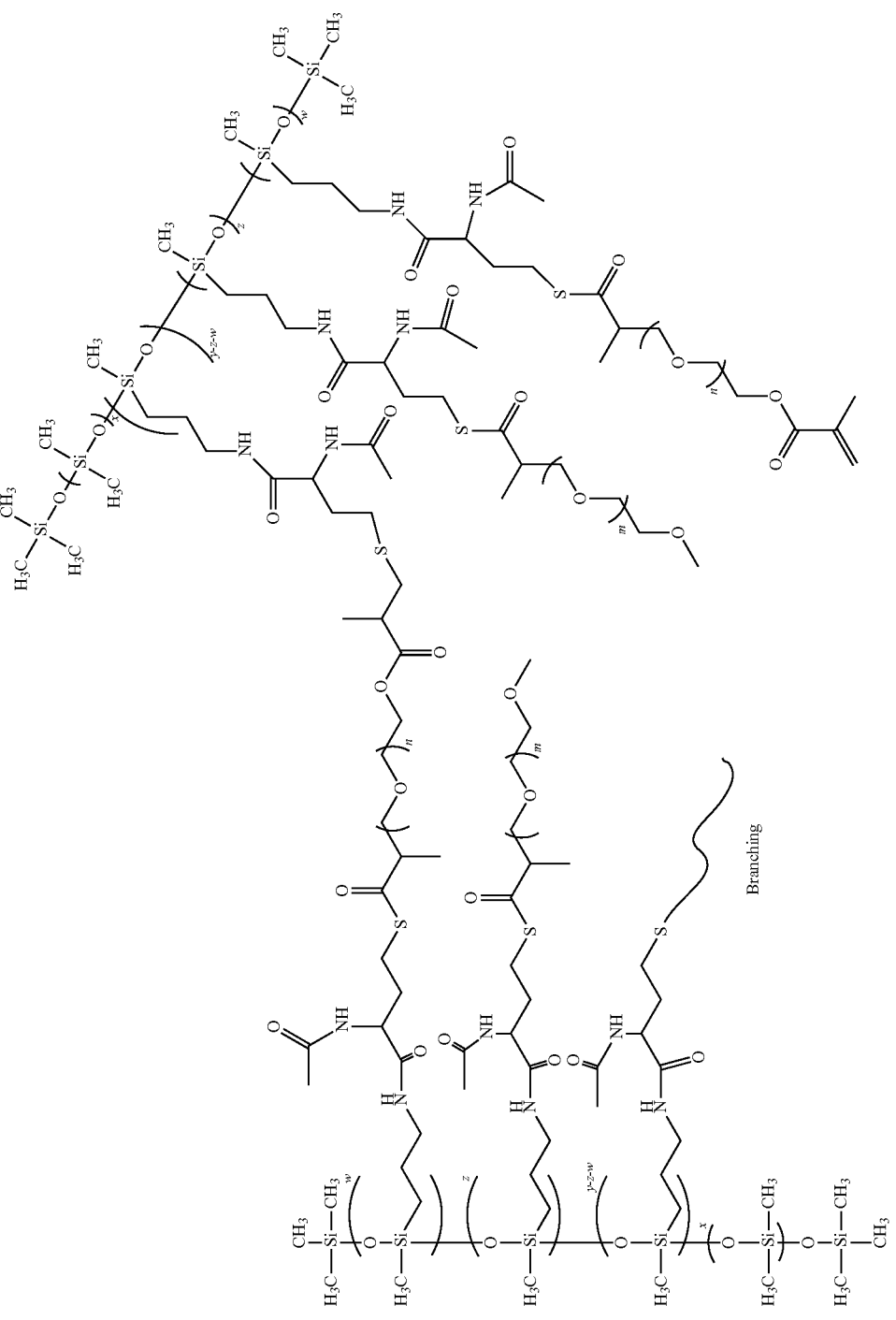

In a 3-neck flask, N-acetylhomocysteine thiolactone (50.012 g), PEG methacrylate (950 g/mol, 12.002 g), PEG dimethacrylate (750 g/mol, 18.942 g) were dissolved in 350 mL of isopropyl alcohol and purged by nitrogen flow for 0.5 h under stirring. Then aminoPDMS (8000 g/mol, 50.012 g) and dimethlyphenylphosphine (176 mg) were added. The mixture was stirred under nitrogen flow for 16 h. The product was purified by dialysis against IPA/water=1/1 (v/v) 6 times. The, the product was concentrated on rotary evaporator with addition of 200 ppm (10 mg) BHT, followed by drying in high vacuum. Colorless viscous fluid was obtained in ~85% yield. The product exhibit good compatibility with NVP monomer at NVP/macromer=1/1 and 4/1 weight ratio.

Example 2

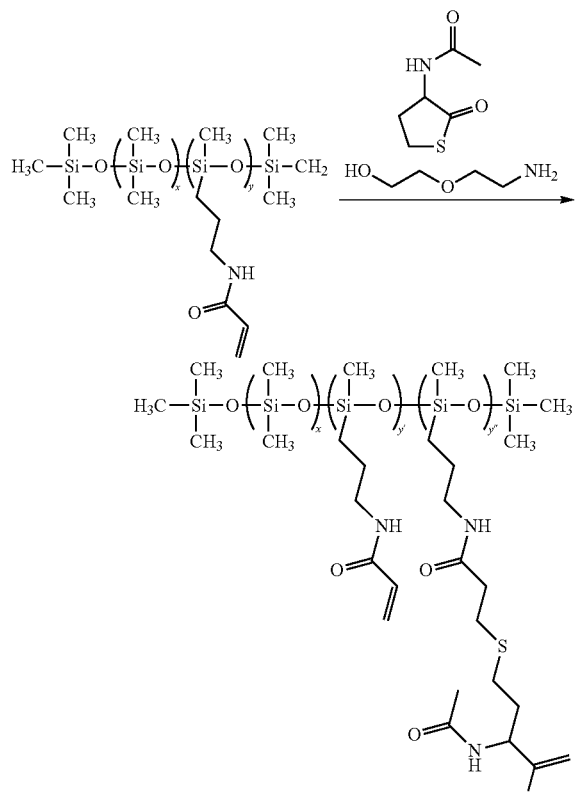

Experimental Procedure

In a 3-neck flask, N-acetylhomocysteine thiolactone (1.387 g), acrylamidoalkyl-functionalized PDMS (38000 g/mol, 10.001 g) were dissolved in 50 mL of IPA solvent and purged by nitrogen flow for 0.5 h under stirring. Then, 2-(2-aminoethoxy)ethanol (0.959 g) and dimethylphenylphosphine (0.065 mg) in 20 mL of IPA were added. The mixture was stirred under nitrogen flow for 16 h. The product was purified by dialysis against IPA/water=80/20 (v/v) 5 times. The, the product was concentrated on rotary evaporator. Then, 50 mL of IPA containing 20 mg of BHT inhibitor was added to redissolve the product. After removal solvent on rotary evaporator and drying in high vacuum, 7.566 g colorless viscous fluid was obtained. The product exhibit good compatibility with NVP monomer at NVP/macromer=1/1 and 4/1 weight ratio.

What is claimed is:

1. An amphiphilic branched polydiorganosiloxane macromer, comprising a polydiorganosiloxane polymer chain terminated with two terminal groups free of any ethylenically unsaturated group, wherein the polydiorganosiloxane polymer chain comprises:

(1) at least 5 dimethylsiloxane units in a consecutive sequence;

(2) at least two first siloxane units of

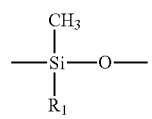

in which $R_1$ is a monovalent radical of formula (I); and

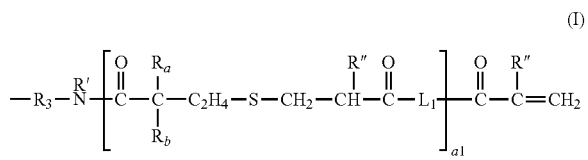

(3) at least one second siloxane unit

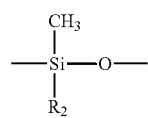

in which $R_2$ is a monovalent radical of formula (II), (III) or (IV)

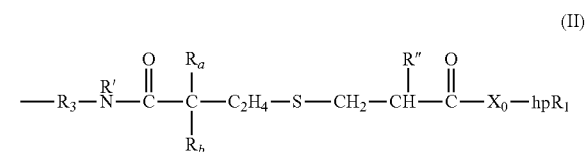

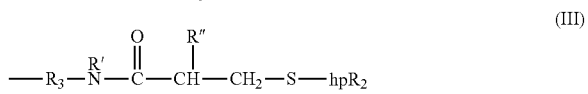

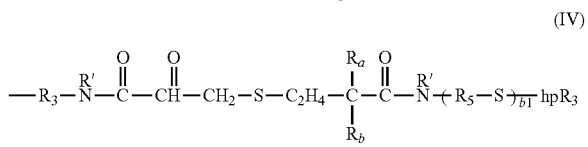

in which
 a1 and b1 independent of each other are 0 or 1,
 R' is hydrogen or $C_1$-$C_4$ alkyl, R" is hydrogen or methyl,
$R_a$ is hydrogen or methyl,
$R_b$ is hydrogen, $C_1$-$C_3$ alkyl, acetyl, or $C_2$-$C_4$ alkanoylamino which optionally has a carboxyl group,
$R_3$ and $R_5$ independent of each other are a $C_1$-$C_6$ alkylene divalent radical,
$X_0$ is oxygen or NR',
$L_1$ is a divalent radical of any one of (a) —$NR_4$— in which $R_4$ is hydrogen or $C_1$-$C_3$ alkyl,

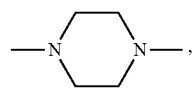
(b)

(c) —NR"—$L_2$—NR"— in which R" is hydrogen or methyl and $L_2$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O—$L_3$—O— in which $L_3$ is a $C_1$-$C_6$ alkylene divalent radical, a divalent radical of

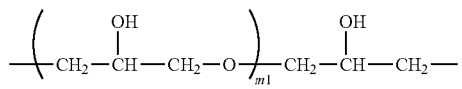

in which m1 is 1 or 2, a divalent radical of

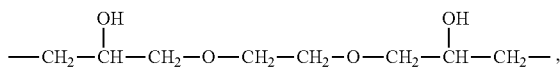

a divalent radical of

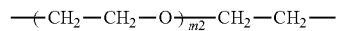

in which m2 is an integer of 1 to 5, a divalent radical of

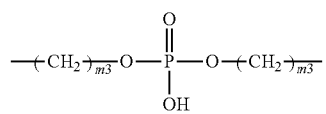

in which m3 is 2 or 3, or a substituted $C_3$-$C_8$ alkylene divalent radical having a hydroxyl group or phosphonyloxy group,
$hpR_1$ is hydroxyethoxy, hydroxypropyloxy, 2-hydroxypropyloxy, 1,2-dihydroxypropyloxy, dimethylaminoethoxy, dimethylamino, hydroxyethylamino, hydroxypropylamino, tris(hydroxymethyl)methylamino, dimethylaminoethylamino, or trimethylammonioethylphophonyloxyethoxy

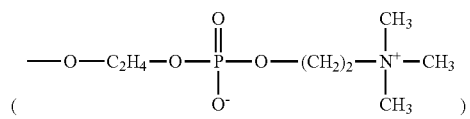

group, a monovalent radical of

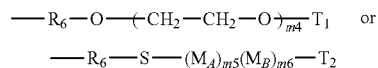

in which $X_o$ is oxygen or NH, m4 is an integer of 2 to 40, m5 and m6 independent of each other are integer of 0 to 40 while (m5+m6)≥3, $T_1$ and $T_2$ independent of each other are hydrogen or $C_1$-$C_4$ alkyl, $R_6$ is a direct bond or a $C_2$-$C_6$ alkylene divalent radical, $M_A$ and $M_B$ independent of each other are a monomeric unit of a vinylic monomer selected from the group consisting of (meth)acrylamide, N,N-dimethyl (meth)acrylamide, N-vinylpyrrolidone, N-vinyl-N-methyl acetamide, N-vinyl formamide, N-vinyl acetamide, N-methyl-3-methylene-2-pyrrolidone, glycerol methacrylate, N-hydroxyethyl (meth)acrylamide, N-hydroxypropyl (meth)acrylamide, hydroxyethyl (meth)acrylate, hydroxypropyl (meth)acrylate, trimethylammonioethylphophonyloxyethyl (meth)acrylate, $C_1$-$C_4$-alkoxy polyethylene glycol (meth)acrylate having a weight average molecular weight of up to 1500 Daltons, vinyl alcohol, and mixtures thereof,
$hpR_2$ is a $C_2$-$C_4$ alkyl having 2 to 3 hydroxy groups or a monovalent radical of

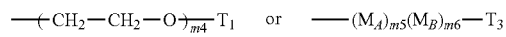

in which $T_3$ is $C_1$-$C_6$ alkyl which is substituted with at least one of cayno, phenyl, carboxy and carboxylate group,
$hpR_3$ is a monovalent radical of

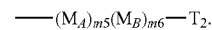

2. The amphiphilic branched polydiorganosiloxane macromer of claim 1, wherein in formula (I) to (IV) $R_a$ is hydrogen and $R_b$ is acetylamino, propionylamino or butyrylamino.

3. The amphiphilic branched polydiorganosiloxane macromer of claim 1, wherein $R_2$ is a monovalent radical of formula (II).

4. The amphiphilic branched polydiorganosiloxane macromer of claim 1, wherein $R_2$ is a monovalent radical of formula (III).

5. The amphiphilic branched polydiorganosiloxane macromer of claim 1, wherein $R_2$ is a monovalent radical of formula (IV).

6. The amphiphilic branched polydiorganosiloxane macromer of claim 1, wherein the amphiphilic branched polydiorganosiloxane macromer further comprises at least one unit of formula (V)

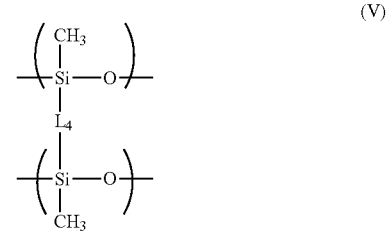

in which $L_4$ is a divalent radical of formula (VI)

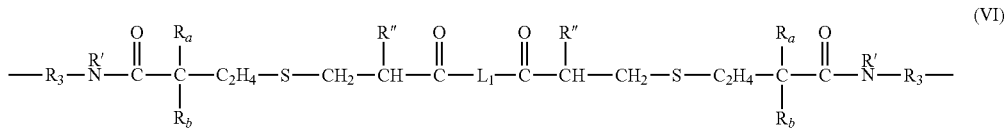

in which R', R", $R_a$, $R_b$, $R_3$, and $L_1$ are as defined in claim 1.

7. The amphiphilic branched polydiorganosiloxane macromer of claim 1, wherein the amphiphilic branched polydiorganosiloxane macromer is defined by formula (VII)

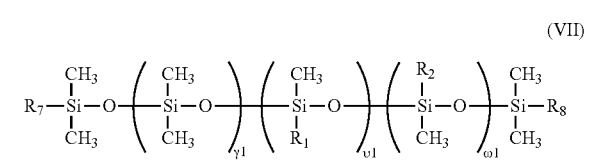

in which $R_1$ and $R_2$ are as defined in claim 1, $\gamma1$ is an integer of from 5 to 100, $\upsilon1$ is an integer of from 2 to 6, and $\omega1$ is an integer of from 1 to 20, $R_7$ and $R_8$ independent of each other are $C_1$-$C_{12}$ alkyl.

8. The amphiphilic branched polydiorganosiloxane macromer of claim 1, wherein the amphiphilic branched polydiorganosiloxane macromer comprises two or more polydiorganosiloxane polymer chains, wherein each pair of polydiorganosiloxane polymer chains is connected at one siloxane unit of each polydiorganosiloxane polymer chains through at least one linkage of formula (VI)

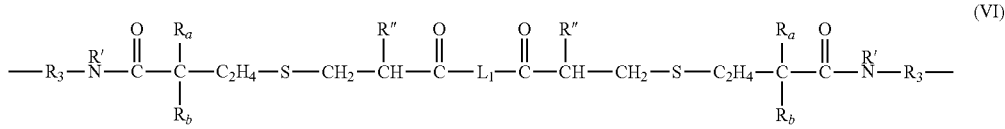

in which R', R", $R_a$, $R_b$, $R_3$, and $L_1$ are as defined in claim 1, wherein each polydiorganosiloxane polymer chain is terminated with two terminal group free of ethylenenically unsaturated group and comprises at least 5 dimethylsiloxane units in a consecutive sequence, at least two first siloxane units of

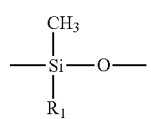

in which $R_1$ is defined in claim 1, and at least one second siloxane unit

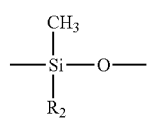

in which $R_2$ is defined in claim 1.

9. The amphiphilic branched polydiorganosiloxane macromer of claim 1, wherein the amphiphilic branched polydiorganosiloxane macromer has an average molecular weight of at least about 3000 Daltons.

10. A silicone hydrogel contact lens comprising a crosslinked polymeric material comprising:
units of an amphiphilic branched polydiorganosiloxane macromer of claim 1, wherein the silicone hydrogel contact lens, when being fully hydrated, has an oxygen permeability (Dk) of at least about 70 barrers, a water content of from about 25% to about 70% by weight, an elastic modulus of from about 0.20 MPa to about 1.2 MPa.

11. The silicone hydrogel contact lens of claim 10, wherein the crosslinked polymeric material further comprises units of a hydrophilic vinylic monomer, units of a siloxane-containing vinylic monomer, units of a hydrophobic vinylic monomer free of silicone, units of a non-silicone vinylic crosslinker, units of a UV-absorbing vinylic monomer, or a combination thereof.

12. The silicone hydrogel contact lens of claim 11, wherein the crosslinked polymeric material further comprises a hydrophilic vinylic monomer is N-vinylpyrrolidone, N,N-dimethyl (meth)acrylamide, (meth)acrylamide, hydroxylethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a weight average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, or combinations thereof.

13. The silicone hydrogel contact lens of claim 12, wherein the crosslinked polymeric material further comprises units of a siloxane-containing vinylic monomer, units of a hydrophobic vinylic monomer free of silicone, units of a non-silicone vinylic crosslinker, units of a UV-absorbing vinylic monomer, or a combination thereof.

14. A method for producing silicone hydrogel contact lenses, comprising the steps of:
preparing a lens-forming composition which is clear at room temperature and/or at a temperature of from about 0 to about 4° C., wherein the lens-forming composition comprises at least one amphiphilic branched polydiorganosiloxane macromer of claim 1 and at least one free-radical initiator;

introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;

curing thermally or actinically the lens-forming composition in the lens mold to form a silicone hydrogel contact lens, wherein the silicone hydrogel contact lens has an oxygen permeability (Dk) of at least about 70 barrers, a water content of from about 25% to about 70% by weight, an elastic modulus of from about 0.2 MPa to about 1.2 MPa.

15. The method of claim 14, wherein the lens-forming composition is a solventless liquid mixture and comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof.

16. The method of claim 14, wherein the lens-forming composition comprises an organic solvent.

17. The method according of claim 14, wherein the lens-forming composition further comprises a hydrophilic vinylic monomer.

18. The method of claim 17, wherein the hydrophilic vinylic monomer is a hydrophilic N-vinyl monomer.

19. The method of claim 14, wherein the lens-forming composition further comprises a non-silicone vinylic crosslinker, a siloxane-containing vinylic monomer, a hydrophobic vinylic monomer free of silicone, a UV-absorbing vinylic monomer, or combinations thereof.

20. The method of claim 14, wherein the step of curing is carried out thermally.

* * * * *